United States Patent
Schlossman et al.

(10) Patent No.: US 8,054,958 B2
(45) Date of Patent: Nov. 8, 2011

(54) UNIVERSAL SMDR BUFFER

(75) Inventors: David Y. Schlossman, Burlingame, CA (US); John F. Doehner, Manchester, NH (US)

(73) Assignee: AT Comm Corporation, San Mateo, CA (US)

( * ) Notice: Subject to any disclaimer, the term of this patent is extended or adjusted under 35 U.S.C. 154(b) by 1393 days.

(21) Appl. No.: 11/297,556

(22) Filed: Dec. 7, 2005

(65) Prior Publication Data

US 2006/0140371 A1 Jun. 29, 2006

Related U.S. Application Data

(60) Provisional application No. 60/636,505, filed on Dec. 15, 2004.

(51) Int. Cl.
*H04M 15/00* (2006.01)
(52) U.S. Cl. ............... 379/126; 379/88.17; 379/115.01; 379/117
(58) Field of Classification Search ............... 379/88.25, 379/117, 126, 225, 88.17, 198, 231, 232; 370/352, 908, 910, 466, 469
See application file for complete search history.

(56) References Cited

U.S. PATENT DOCUMENTS

| | | | | |
|---|---|---|---|---|
| 5,159,698 | A * | 10/1992 | Harrington et al. | 379/115.01 |
| 5,333,183 | A * | 7/1994 | Herbert | 379/112.07 |
| 6,178,453 | B1 * | 1/2001 | Mattaway et al. | 709/227 |
| 6,760,420 | B2 * | 7/2004 | Heilmann et al. | 379/189 |
| 2001/0019605 | A1 * | 9/2001 | Rojas | 379/114.03 |
| 2002/0094070 | A1 * | 7/2002 | Mott et al. | 379/133 |

OTHER PUBLICATIONS

Xiox Corporation, Telecommunication management system 24 pages.*
Xiox Intelligent BufferTechnical Specification, Xiox Corporation, Issued Jun. 26, 1998 Burlingame, California.
Xiox Intelligent Buffer Installation Guide Jul. 1998, Xiox Corporation, Burlingame, California.

* cited by examiner

*Primary Examiner* — Curtis Kuntz
*Assistant Examiner* — Yosef K Laekemariam
(74) *Attorney, Agent, or Firm* — Marger Johnson & McCollom, P.C.

(57) ABSTRACT

The present invention provides a highly flexible system that can receive SMDR messages in many different formats and process these messages to produce useful reports and control information. The system can collect data via a LAN/WAN connection from PBX systems with internal data storage, PBX systems without internal data storage and legacy PBX systems that are connected to a buffer for storage of SMDR records.

18 Claims, 8 Drawing Sheets

Telnet Threads

FTP Upload Thread

UNIVERSAL SMDR BUFFER

RELATED APPLICATIONS

This application is a non-provisional application of provisional application Ser. No. 60/636,505 that was filed Dec. 15, 2004. Priority of application 60/636,505 is hereby claimed and the entire content of application 60/636,505 is hereby incorporated herein by reference.

FIELD OF THE INVENTION

The present invention relates to telephone systems and more particularly to systems and methods for handling Station Message Detail Recordings (SMDRs).

BACKGROUND

A Private Branch Exchange (usually abbreviated PBX) is a telephone switch that serves a selected group of users and that usually provides access to the public switched network. Many early PBX systems provided a record of the calls that originated in the PBX or that where received by the PBX by printing this information concerning such calls on a paper tape. The information about calls made and received by the PBX where called Station Message Detail Recordings. The name Station Message Detail Recording is generally abbreviated SMDR and such records are often referred to as SMDR messages.

Modern PBX systems are generally electronic computerized systems that can provide wide array of services. With the advent of Voice over Internet Protocol (VoIP) technology, modern PBX systems allow voice to be routed as data packets over the Internet or over private networks.

For a variety of reasons, modern PBX systems, including VoIP systems, produce SMDR messages. Today, there are many different types of PBX systems that produce SMDR messages and furthermore some PBX systems produce the SMDR messages in accordance with proprietary and different protocols.

There is a need for a universal system for recording interpreting and providing access to SMDR messages.

SUMMARY OF THE INVENTION

The present invention provides a highly flexible system that can receive SMDR messages in many different formats and process these messages to produce useful reports and control information.

DETAILED DESCRIPTION

Figure 1:
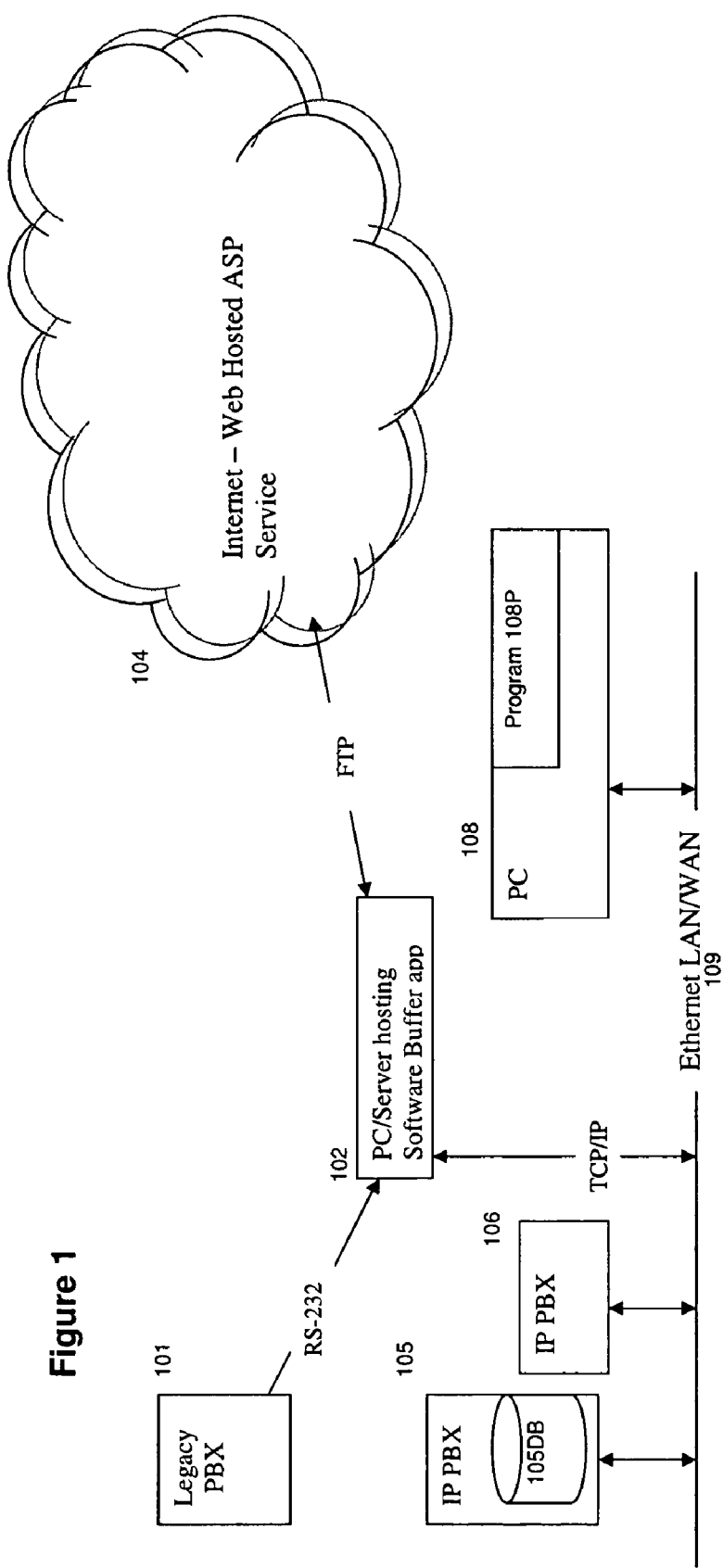
FIG. 1 is an overall system diagram of a preferred embodiment.

Several preferred embodiments of the present invention will now be described with reference to the accompanying drawings. Those skilled in the art will recognize that various other embodiments of the invention are also possible and practical. This invention may be embodied in many different forms and the invention should not be construed as being limited to the embodiments set forth herein.

The figures listed above illustrate a preferred embodiment of the invention and the operation of such an embodiment. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiment to those skilled in the art. Those parts and elements not shown are conventional and known in the art.

FIG. 1 is an overall diagram of a first embodiment of the invention. The system shown in FIG. 1 includes three PBXs 101, 105 and 106. PBX 101 is a legacy PBX, PBX 105 is an Internet Protocol (IP) PBX that includes a data base 105DB that stores SMDR records, and PBX 106 is an IP PBX that does not include an internal data base for storage of SMDR records.

A PC/Server 102 is connected to the legacy PBX 101 by a conventional RS-232 connection. The PC 102 includes a software buffer application that retrieves and stores SMDR records. The PC 102 can also connect to the web hosted application service provider (ASP) 104. An example of a software buffer application and of a web hosted application service provider is provided below.

The IP PBXs 105 and 106 are connected to the Ethernet LAN/WAN 109. A PC 108 that includes a program 108P is also connected to the Ethernet LAN/WAN 109. The operation of program 108P will be explained with reference to FIGS. 3 to 8.

The three PBXs 101, 105 and 106 shown in FIG. 1 represent a particular combination of different types of PBXs. It should be noted that alternate embodiments include many different combinations of PBXs. Some embodiments include more that one PBX of each type. Some embodiments do not include all of the different types of PBXs. The combination shown in FIG. 1 is merely one specific embodiment that illustrates a combination of different types of PBXs in a single system.

For example, legacy PBX 101 could be a Nortel Meridian1, Option 11 PBX that has been a popular business PBX for twenty years. It is noted in the literature for the Nortel meridian PBX, SMDR records are referred to as Call Detail Records (abbreviated CDR records). The terms SMDR and CDR as used herein are synonymous.

The IP PBX 105 could for example be a Nortel BCM50 PBX. The Nortel BCM50 PBX can write CDR (i.e. SMDR) records to a pre-determined shared hard drive that is connected to a LAN. The system shown in FIG. 1 reads from such a shared hard drive in a conventional manner.

The IP PBX 106 could for example also be a Nortel BCM50 PBX, where the shared drive that stores data is in the PC 108.

The PC 102 could for example be a Microsoft Windows 2000 Server or a Microsoft Windows 2003 Server hosting a software buffer such as that marketed by AtComm Corporation of San Mateo, Calif. Alternatively PC 102 could be connected to a hardware buffer such as the buffer marketed by AtComm Corporation, under the name "Xiox Solutions Intelligent Buffer". That is, either a hardware or a software buffer could be used to collect SMDR records from PBX 101 via a RS 123 protocol and to deliver these records to an application running on PC 102. It is noted that the buffer may be connected directly to the PC 102, it may be a part of PC 102 or it may be remotely accessed by the PC 102. The PC 102 can send SMDR records to ASP 104 via FTP or it can send SMDR records to program 108 in PC 108 via a TCP/IP protocol.

The Internet web Hosted ASP service 104 could for example be call accounting and productivity reporting service marketed by AtComm Corporation under the trademark CommView. The CommView ASP is a one hundred percent web-based host subscription service that provides business and IT managers with PBX call usage analysis reports.

The combination of the legacy PBX 101, the PC/Server hosting software hosting software buffer application and the Internet web hosted ASP service 104 forms a prior art type of SMDR analysis and reporting system. With the present invention a prior art reporting system (which may for example include units 101, 102 and 104) can be integrated into a universal type of system that is provided by the present invention.

With the present invention each of the units 105, 106 and 102 are connected to the Ethernet LAN/WAN 109. LAN/WAN 109 is in turn connected to the personal computer 108. Personal computer 108 can for example be a conventional personal computer operating under the Microsoft Windows operating system. The conventional parts of PC 108 are not shown or described herein. The part of PC 108 of particular relevance to the present invention is the program 108P that runs on PC 108. Program 108P is described later with reference to FIGS. 3 to 8.

As explained below, PC 108 can receive data on LAN/WAN 109 using a variety of protocols. For example, the data may be transmitted using a File Transfer Protocol (FTP) or using an Open DataBase Connectivity Protocol (ODBC). ODBC is a standard database access protocol.

Figure 2:
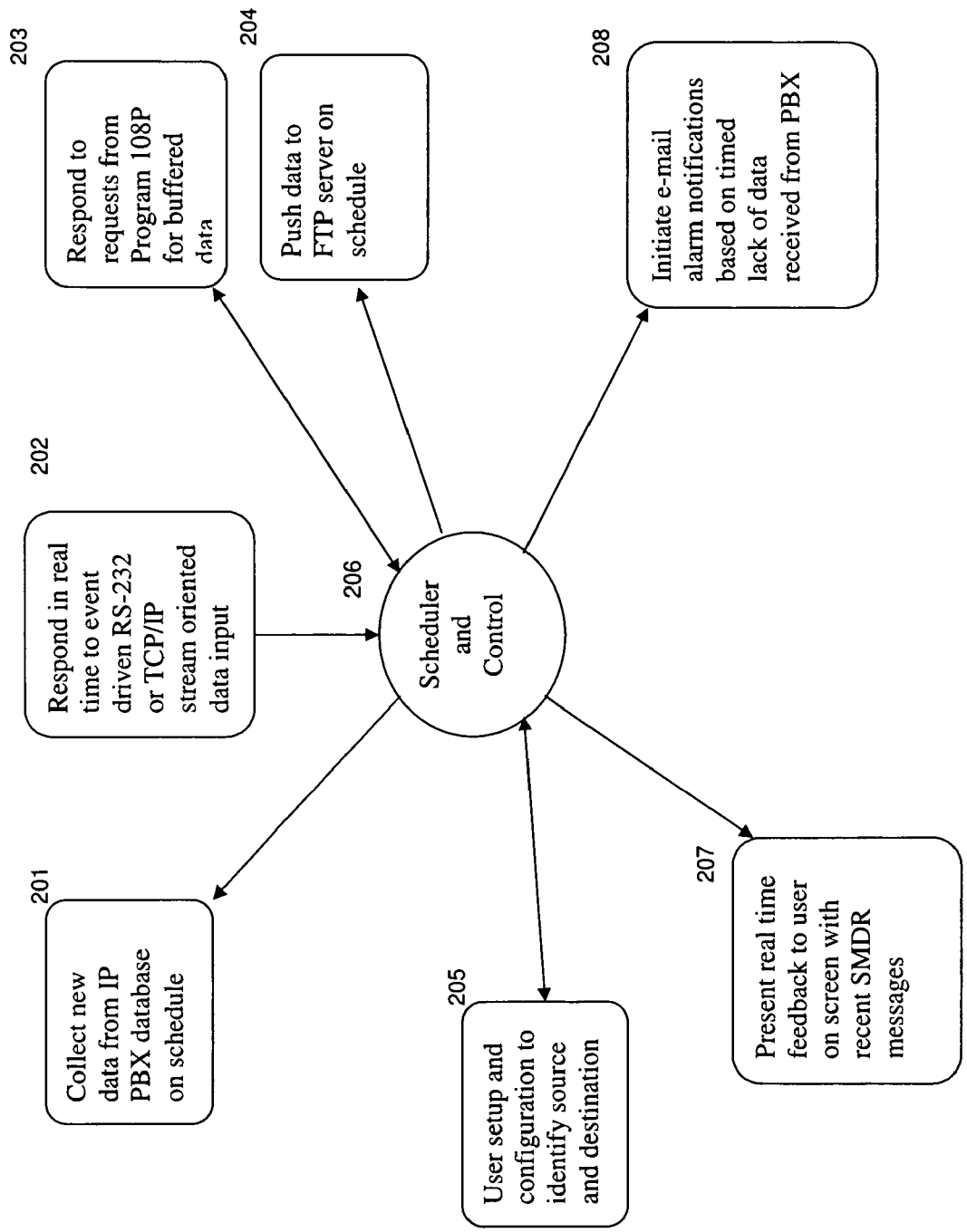
FIG. 2 illustrates the various inputs and outputs received by the system.

FIG. 2 illustrated the various inputs and outputs of the program 108P. As is conventional, the program 108P has a central scheduler and controller 206 that controls the various operations that are performed.

As indicated by block 205, there is a conventional user set up and configuration facility or program that identifies the source and destination of information and the various operations that need be performed.

As indicated by block 201, data is collected from the data base 105DB on a specified schedule. This could for example be an hourly or a daily occurrence depending on the amount of traffic and the size of the database.

As indicated by block 202, the program can respond to real time events that are provided via a RS-232 or TCP/IP steam oriented data input. It is noted that in the system shown in FIG. 1, there is not direct RS-232 input to the PC 108; however, alternate embodiments have such an interface. As indicated by block 203, the scheduler can respond to requests received from program 108P for buffered data.

As indicated by blocks 204, 207 and 208 the scheduler and control 206 causes data to be provided under various situations. Block 204 indicates that data can be pushed to an FTP server (not shown in FIG. 1) on a schedule specified by the operator. As indicated by block 208, the system can initiate e-mail alarm notifications based on timed lack of data received from a particular PBX. As indicated by block 207, the system can present real time feed back to the user on screen concerning recent SMDR messages.

FIG. 3 to 8 illustrate the operations performed by the program 108P.

Figure 3:
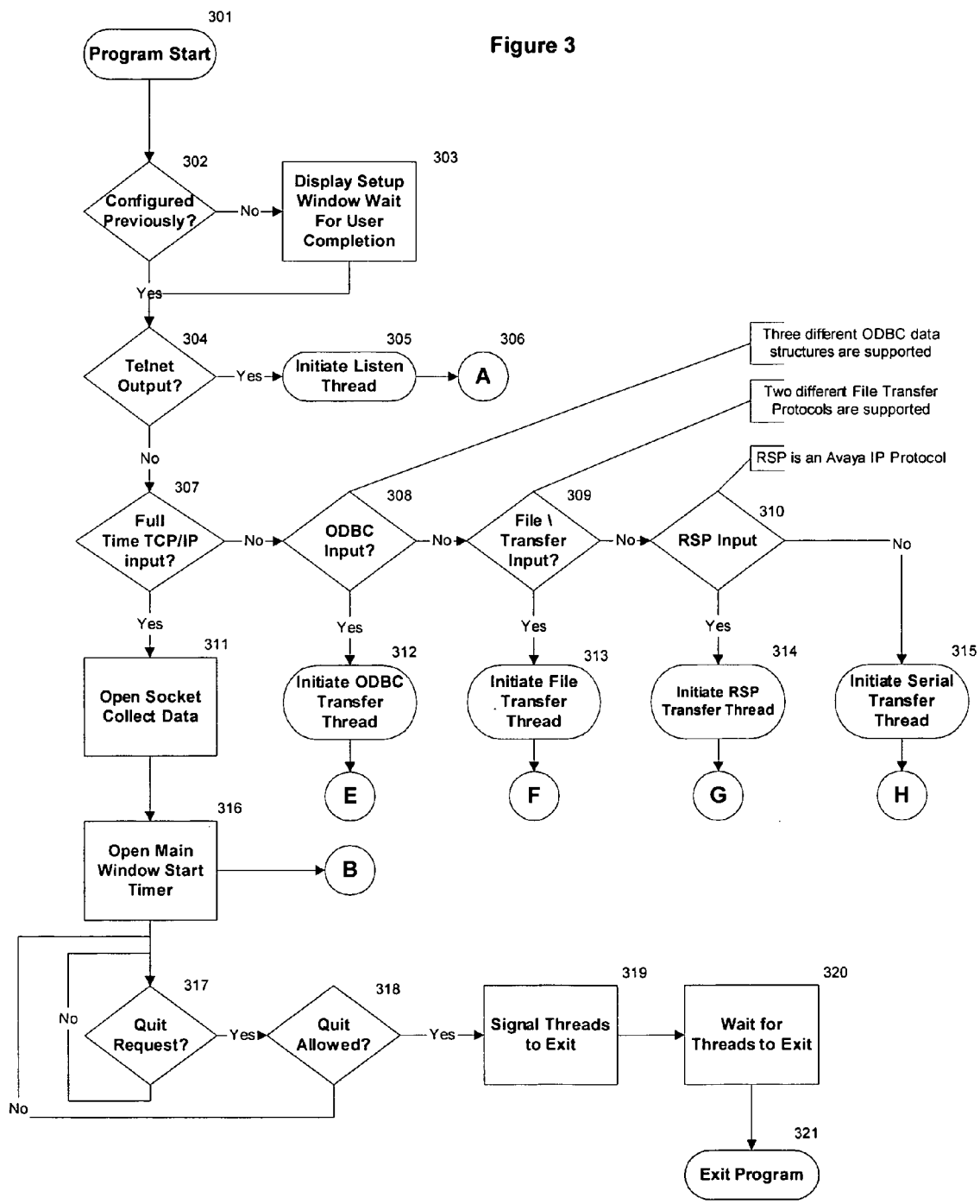
FIG. 3 is a block diagram illustrating the main program.

FIG. 3 shows what occurs when the program starts. As indicated by blocks 301, 302, and 303, a check is made to determine if the system was previously configured, a conventional window is presented that allows the user or administrator to configure the system.

Figure 4:
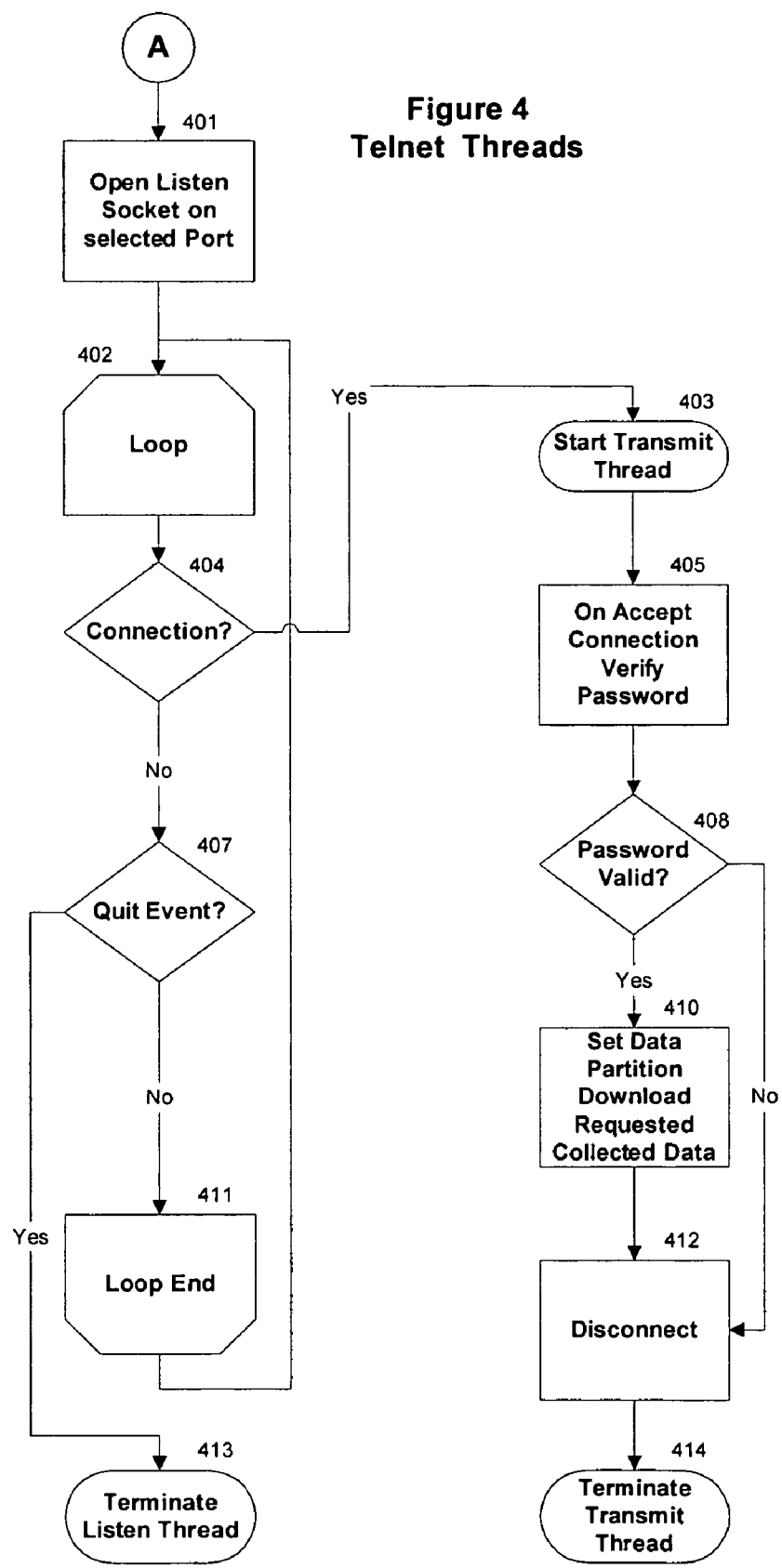
FIG. 4 is a block diagram illustrating operation on the Telnet threads.

First as indicated by block 304, a check is made to determine if there is a telnet input. If there is, blocks 305 and 306 indicate that a listen thread begins. The operation of this thread is shown in FIG. 4.

Figure 7:
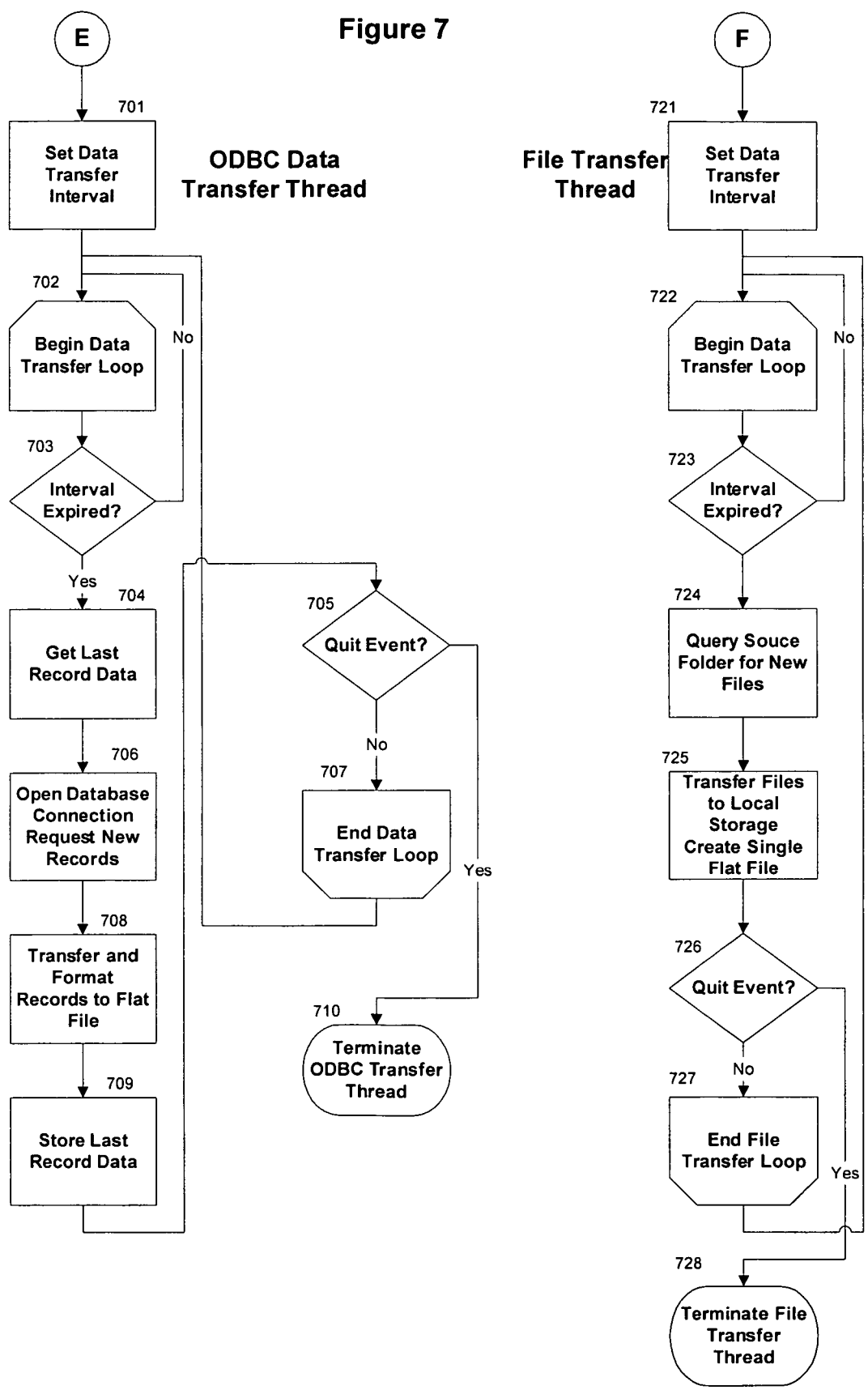
FIG. 7 is a block diagram illustrating the ODBC data Transfer Thread and the File Transfer Thread.

As indicated by blocks, 307, 308, 309, and 310 the existence of various types of TCP/IP is checked. If one of the three types of ODBC inputs begins, block 312 begins the transfer thread. The ODBC transfer thread is shown in FIG. 7.

Figure 8:
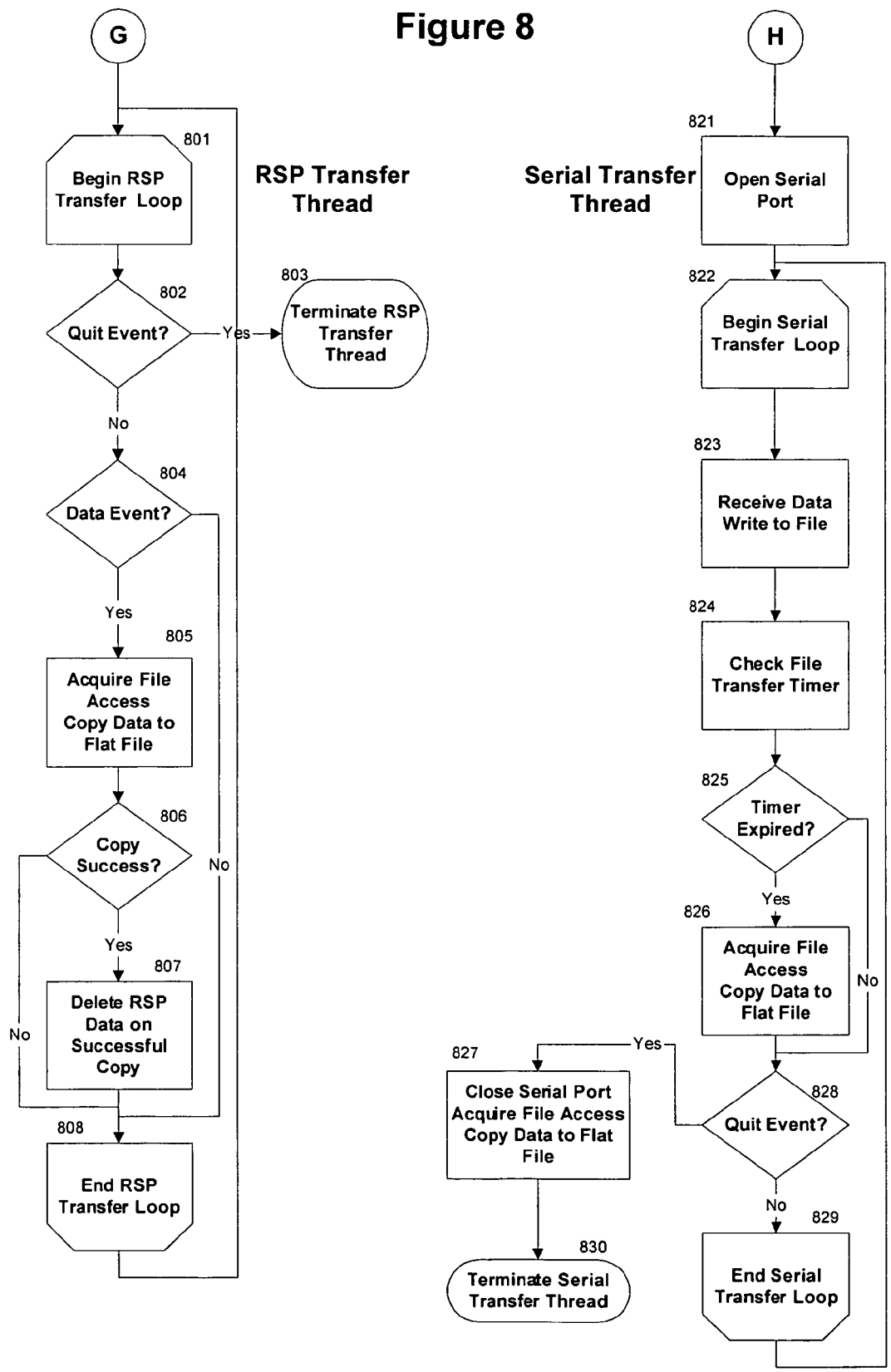
FIG. 8 is a block diagram illustrating RSP transfer thread and the serial transfer thread.

Similarly block 313, 314 and 315 indicate if various other types of input threads exist. There are two possible FTP trades that can be initiated by bold 313. Block 314 related to an RSP Avaya IP Protocol and block 315 relates to a serial transfer thread. The details of these other threads are shown in FIGS. 7 and 8.

Figure 5:
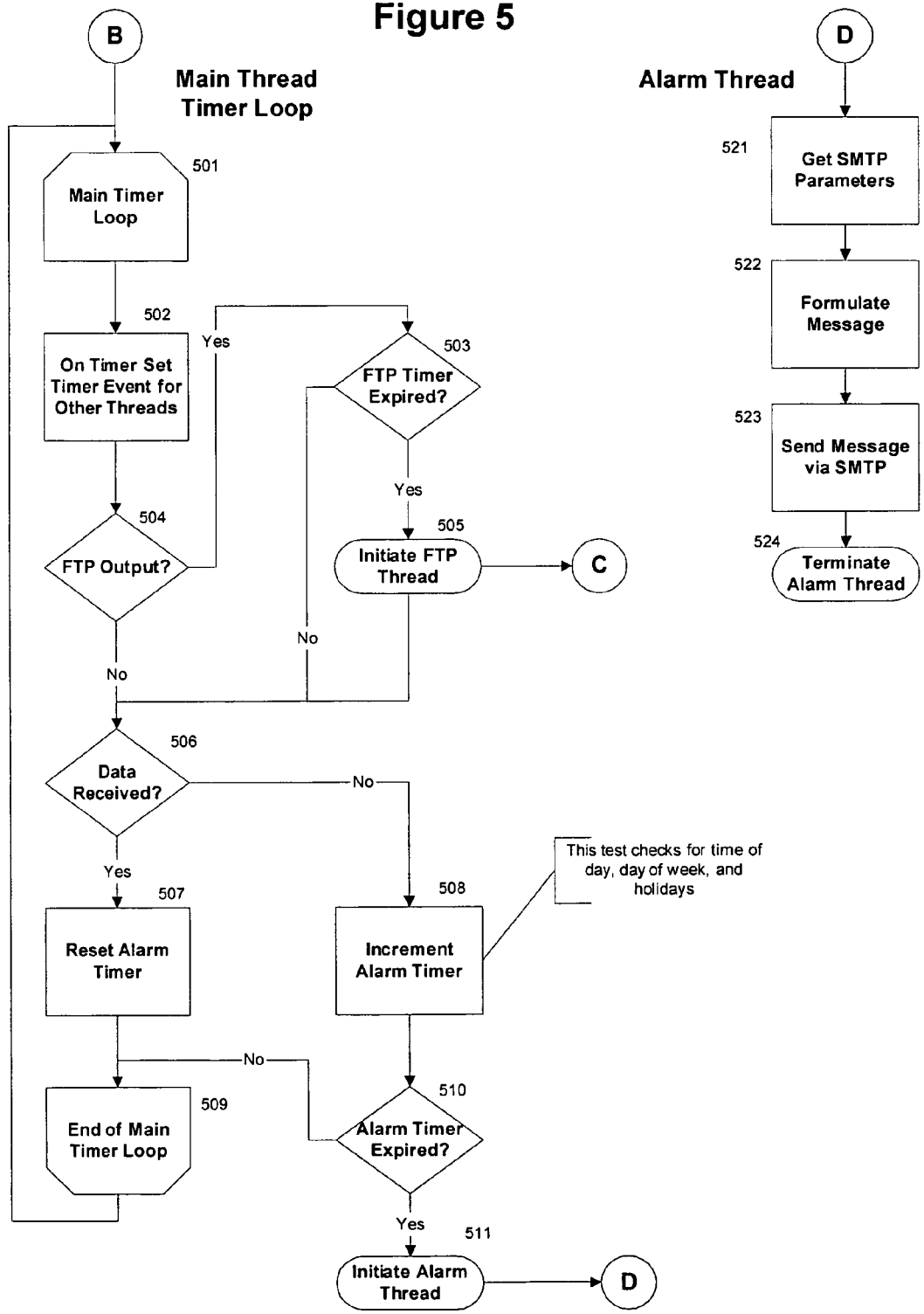
FIG. 5 is a block diagram illustrating the main timer loop and the alarm thread.

As indicated by blocks 311 and 316, sockets are opened to collect data as appropriate in a conventional manner and as indicated by block 316 a time loop is started. The details of this lop is shown in FIG. 5.

Blocks 317, 318, 319 and 320 relate to a conventional process to determine if there is a quit request, determine if it is allowed, exit the various threads and finally exit the program as indicated by block 321.

The details of how the Telnet thread is handled are shown in FIG. 4. As indicated by block 401 and 402, a listen socket is opened in a conventional manner and a listen loop is started. Block 404 indicates if a connection exists. If it does exist, the thread is started an indicated by block 403. As indicated by blocks 405 and 408, a check is made for a password. The data is partitioned in a conventional manner as indicated by block 410 and the connection is disconnected and terminated as indicated by block 412 and 414.

Block 407 and 411 determine if the listen thread should be terminated as indicated by block 413 or, if as indicated by block 411, the loop shown end and go back to block 402.

FIG. 5 shows the details of the main timer loop and of the alarm thread. The main timer has a loop between block 501 and 509. As indicated by block 502, this loop sets the timer event for other threads As indicated by blocks 503, 504, and 505, a check is made for FTP output and to determine if the FTP timer has expired. The FTP thread, shown in FIG. 6, is initiated as indicated by block 505.

If data is received, the timer alarm is reset as indicated by block 506 and 507. If data is not received as determined by block 507, the alarm timer is incremented as indicated by block 508 and a check is made to determine if the alarm has expired as indicated by block 510. The alarm thread (which is also shown in FIG. 5 is initiated as indicated by block 511.

The alarm thread shown in FIG. 5, gets the SMTP parameters in a conventional manner as indicated by block 521 and a message is formulated as indicated by block 522. An alarm message is sent via SMTP (in a conventional manner) as indicated by block 523 and the alarm thread is terminated as indicated by block 524.

Figure 6:
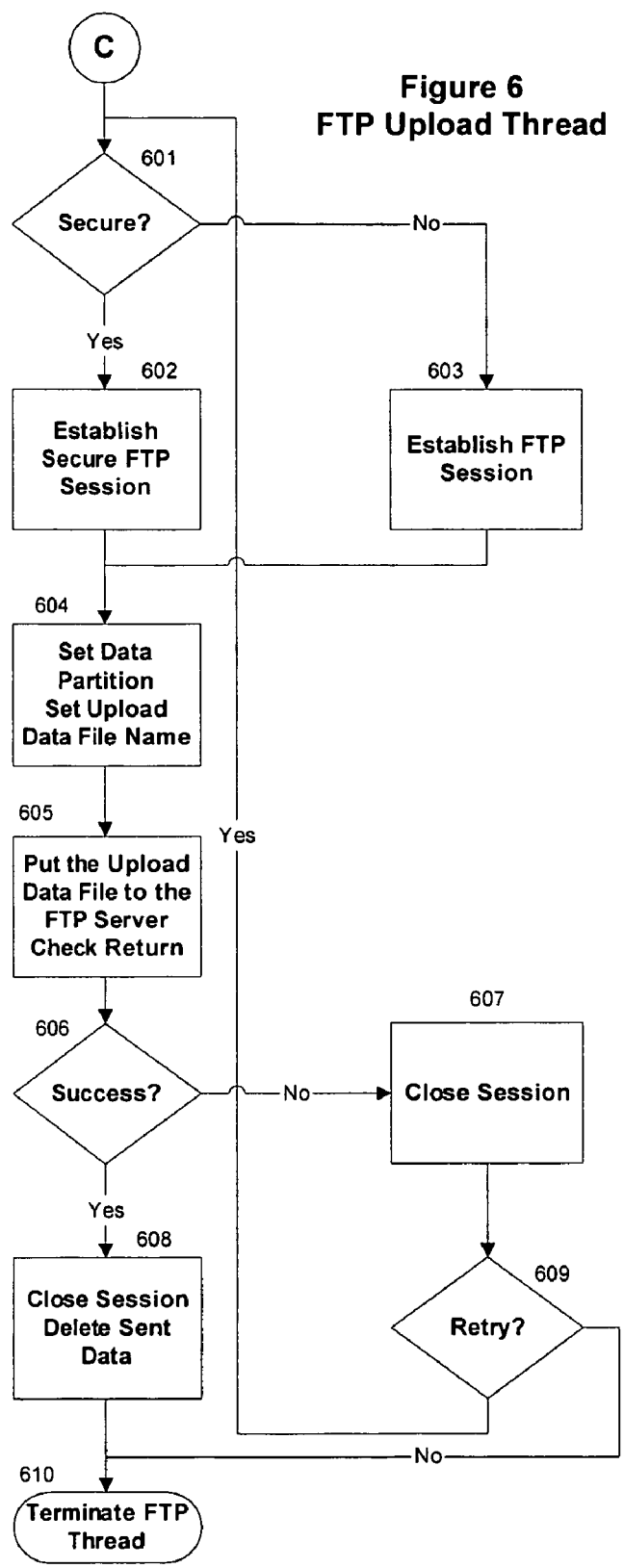
FIG. 6 is a block diagrams illustrating the FTP upload thread

The details of the FTP upload thread are shown in FIG. 6. A secure or a regular FTP session is established as indicated by blocks 601, 602 and 603. The type of session is established at setup time in a conventional manner. The data file is placed on the FTP server as indicated by blocks 604 and 605. If the session is successful, it is closed as indicated by blocks 606 and 608. If it is not successful, the session is closed and possibly retried as indicated by blocks 607 and 609. Finally the session is terminated as shown by block 610.

The ODBC data transfer thread and the File Transfer thread are shown in FIG. 7. The ODBC transfer thread first sets the data transfer interval as indicated by block 701. The loop from blocks 702 to 707 then handles the transfer. When the interval has expired as indicated by block 703, the last data record is retrieved as indicated by block 704. As indicated by blocks 706, 708 and 709, the data base connection is opened and the new records are requested. This is done in a conventional manner. The records are transported and formatted as indicated by block 706 and the data is stored as indicated by block 709. A determination is made as to whether or not the event should be terminated as indicated by block 705 and the ODBC thread is terminated as indicated by block 710 if appropriated.

The file transfer thread has a loop as indicated between block 722 and 727. The interval is set as indicated by block 721 and a check to see if the interval has expired is performed as indicated by block 723. The source is queried for new files and the files are transported and stored as indicated by block 724 and 725. A check is made to see if the loop should be terminated as indicated by block 726 and if appropriate the thread is terminated as indicated by block 728.

FIG. 8 shows a flow diagram of the RSP transfer thread and of the serial transfer thread. The RSP transfer thread has a loop between blocks 801 and 808. The loop is terminated when a quit event occurs as indicated by blocks 802 and 803. When a data event occurs, the file access is acquired and the file is copied as indicated by block 805. The RSP data is deleted on a successful copy as indicated by blocks 806 and 807.

The serial transfer thread includes a loop between blocks 822 and 829. After the serial port is opened as indicated by block 821, the data is received as indicated by block 823. A timer check is made as indicated by blocks 824 and 825. The data is copied to a flat file as indicated by block 826. The event ends and the port is closed as indicated by block 827 and 828. The serial thread is terminated as indicated by block 830.

The flow diagrams in FIGS. 3 to 8 indicated how data is acquired from various units in the system using a wide variety of protocols. Data can be acquired from various different types of units.

The actual analysis of the data and the manner that reports are generated can be conventional. For example the data analysis and reporting can be similar to that performed by the commerciality available data analysis product marketed by AtComm Corporation.

It is noted that the particular embodiment shown here is merely exemplary of the various embodiment, which are possible with the present invention.

It is also noted that as used herein, the terms SMDR records, SMDR messages, synonymously to mean the same thing. Namely, these terms refer to information records or messages produced by a PBX to provide information concerning calls handled by the PBX. Likewise as used herein the terms SMDR records and SMDR messages include messages and records sometimes referred to as Call Detail Records or CDR records and by other similar terms that refer to information records or messages produced by a PBX to provide information concerning calls handled by the PBX.

That is, while the invention has been shown and described with respect to preferred embodiments thereof, it should be understood that a wide variety of other embodiments are possible without departing from the scope and sprit of the invention. The scope of the invention is only limited by the appended claims.

We claim:

1. A system for gathering and analyzing Station Message Detail Records (SMDR records) from a plurality of PBX systems comprising:
    a computer configured to obtain SMDR records from a legacy PBX through a serial RS-232 connection, and further configured to obtain SMDR records from an Internet Protocol (IP) PBX by way of a LAN/WAN; and
    a web hosted application service provider (ASP) configured to receive from the computer the SMDR records from the legacy PBX and the SMDR records from the IP PBX, and further configured to analyze the SMDR records from the legacy PBX and the SMDR records from the IP PBX.

2. The system recited in claim 1 further comprising a software buffer for storage of SMDR records from the legacy PBX.

3. The system recited in claim 1 wherein the computer is coupled to the LAN/WAN by way of an Ethernet connection.

4. The system recited in claim 1 wherein the IP PBX is configured to transmit data to said computer utilizing a TCP/IP protocol.

5. The system recited in claim 1 wherein the computer is configured to receive said SMDR records from the IP PBX utilizing an Open DataBase Connectivity (ODBC) Protocol.

6. The system recited in claim 1 wherein the computer is configured to receive said SMDR records from the IP PBX utilizing a File Transfer Protocol (FTP).

7. The system recited in claim 1 wherein said computer retrieves data from a data base stored in at least one of the legacy PBX and the IP PBX.

8. The system recited in claim 1 wherein the computer is configured to receive said SMDR records from the IP PBX initiated by the IP PBX.

9. The system recited in claim 1 wherein said computer is a personal computer (PC).

10. The system recited in claim 1 wherein said personal computer operates under a Microsoft Windows operating system.

11. A universal system for gathering and analyzing Station Message Detail Records (SMDR records) from a plurality of PBX systems comprising:
    a network coupled to the PBX systems;
    a computer coupled to the network, said computer configured to obtain SMDR records from a first one of the PBX systems using a first protocol, and further configured to obtain SMDR records from a second one of the PBX systems using a second protocol, wherein the second one of the PBX systems comprises an Internet Protocol (IP) PBX, and wherein the first protocol and the second protocol are different; and
    a web hosted application service provider (ASP) configured to receive from the computer the SMDR records from the first and second ones of the PBX systems, and further configured to analyze the SMDR records obtained from the first and second ones of the PBX systems.

12. The system recited in claim 11 wherein the first protocol is a serial RS-232 protocol and the second protocol is a network protocol.

13. The system recited in claim 11 wherein the computer is connected to the ASP through another network.

14. The system recited in claim 11 wherein the computer is configured to obtain SMDR records from the second one of the PBX systems by way of a LAN/WAN.

15. The system recited in claim 14 wherein the computer is coupled to the LAN/WAN by way of an Ethernet connection.

16. The system recited in claim 11 wherein the IP PBX is configured to transmit data to said computer utilizing a TCP/IP protocol.

17. The system recited in claim 11 wherein the computer is configured to receive SMDR records from the second one of the PBX systems utilizing an Open DataBase Connectivity (ODBC) Protocol.

18. The system recited in claim 11 wherein the computer is configured to receive SMDR records from the second one of the PBX systems utilizing a File Transfer Protocol (FTP).

* * * * *